United States Patent [19]

Vucetic

[11] Patent Number: 5,873,036
[45] Date of Patent: Feb. 16, 1999

[54] APPARATUS AND METHOD FOR IMPROVING CELLULAR COMMUNICATION BY ASSOCIATING USERS ON A MOBILE PLATFORM WITH A COMMON PLATFORM IDENTIFIER

[75] Inventor: Jelena Vucetic, Germantown, Md.

[73] Assignee: Watkins-Johnson Company, Palo Alto, Calif.

[21] Appl. No.: 717,300

[22] Filed: Sep. 20, 1996

(Under 37 CFR 1.47)

Related U.S. Application Data

[60] Provisional application No. 60/004,112 Sep. 21, 1995.

[51] Int. Cl.[6] .................................................. H04Q 7/22
[52] U.S. Cl. ..................... 455/439; 455/431; 455/11.1
[58] Field of Search ..................... 455/431, 436, 455/437, 439, 561, 11.1

[56] References Cited

U.S. PATENT DOCUMENTS

| 5,212,804 | 5/1993 | Choate ................................. 455/431 |
| 5,448,569 | 9/1995 | Huang et al. ........................ 455/437 |
| 5,519,761 | 5/1996 | Gilhousen .......................... 455/436 |
| 5,559,865 | 9/1996 | Gilhousen .......................... 455/431 |

*Primary Examiner*—Edward F. Urban
*Attorney, Agent, or Firm*—Flehr Hohbach Test Albritton & Herbert LLP

[57] ABSTRACT

A base station (BS) communicates with a plurality of mobile users in a platform. In one embodiment, the base station and mobile services center (MSC) associates all the mobile users with the platform. The BS and MSC then associate a movement of the platform from one cell to another with a handoff of all the mobile users in the platform. The handoff is complete while the overhead is minimized. Exemplary embodiments are provided for use with the Advanced Mobile Phone Service (AMPS) protocol.

13 Claims, 17 Drawing Sheets

5,873,036

APPARATUS AND METHOD FOR IMPROVING CELLULAR COMMUNICATION BY ASSOCIATING USERS ON A MOBILE PLATFORM WITH A COMMON PLATFORM IDENTIFIER

RELATED APPLICATIONS

This claims priority to provisional patent application titled MULTI-USER CELLULAR NETWORK, filed Sep. 21, 1995, U.S. Ser. No. 60/004,112.

1. Field

The present invention relates to a multi-user cellular communication network. In particular, the present invention is used in a cellular communication network to provide a protocol that supports a multi-user platform handoff.

2. Background

Cellular communication networks are becoming popular due to increased demand for mobile communication. Various types of cellular networks employ different types of communication protocols that provide support for different types of communication. For example, the most basic network provides a separate communication channel for each electronic mobile communication device. In this arrangement, the network must allocate a channel for each device a person may have with them. If the person has a mobile telephone and a mobile fax machine, the network must allocate two separate channels. This increases the mobile management complexity when the person moves from one cell to another. On a larger scale, many transportation platforms such as airplanes and rail cars carry people who wish to use mobile communication devices. When the network must allocate a channel for each communication device, the mobile system management is heavily burdened when the platform moves from one cell to another and the system is required to handoff every mobile user on the platform at once.

Therefore, one limitation to existing cellular communication networks is that the network must allocate a separate channel to each communication device. Another limitation to existing cellular communication networks is that the network must handoff every mobile user on a moving platform when the platform moves from one cell to another.

SUMMARY

The present invention relates to a multi-user cellular communication network. In particular, the present invention is used in a cellular communication network to provide a protocol that supports a multi-user platform handoff. Exemplary embodiments are provided for use with the Advanced Mobile Phone Service (AMPS) protocol.

A base station (BS) communicates with a plurality of mobile users in a platform. In one embodiment, the base station and mobile switching center (MSC) associates all the mobile users with the platform. The BS and MSC then associate a movement of the platform from one cell to another with a handoff of all the mobile users in the platform. The handoff is complete while the overhead is minimized.

Advantages of the invention include reduced overhead because all the mobile users are associated with the platform. Other advantages include reduced switching time for the mobile users, which results is improved communication reliability and high quality service to platforms with many mobile users.

BRIEF DESCRIPTION OF THE DRAWINGS

Additional advantages of the invention will become apparent upon reading the following detailed description and upon reference to the drawings, in which.

DETAILED DESCRIPTION

The present invention relates to a multi-user cellular communication network. In particular, the present invention is used in a cellular communication network to provide a protocol that supports a multi-user platform handoff. Exemplary embodiments are provided for use with the Advanced Mobile Phone Service (AMPS) protocol.

The exemplary embodiments are described herein with reference to specific configurations and protocols. Those skilled in the art will appreciate that various changes and modifications can be made to the exemplary embodiments while remaining within the scope of the present invention.

The exemplary embodiments are based on the IS-634 standard. This standard provides some possibilities to support dynamic channel allocation of services that require a single channel. However, the standard does not provide a protocol for dynamic channel allocation. Moreover, the standard does not support the following features:

1) dynamic channel allocation for services that requires more than one channel;
2) handoff for multi-user mobile platforms; and
3) sectorized cellular networks.

The present invention provides for an extension to the IS-634 standard to support these features. The protocol flow during call processing is similar to the IS-634 standard. The same messages are exchanged in the same order between the MSC and base stations during call processing. One difference is in the internal data structure of some informational elements, which are parts of the IS-634 standard messages.

1. Introduction

Dynamic Channel Allocation (DCA) is a mechanism that allows any radio channel in the available spectrum to be used in any cell of a cellular network as long as co-channel and adjacent-channel interference constraints are obeyed. The decision-making algorithm is implemented in the MSC, rather than in base stations.

During call processing, signaling messages are exchanged between the MSC and base stations. In the case of single-user platforms (one user per mobile platform) requiring just one channel per service (simple voice call), the IS-634 standard protocol has already provided possibilities to implement DCA. However, with new services requiring more than one channel (e.g. conference calls, video, data, etc.), and with mobile platforms carrying more than one user (e.g. airplanes, trains, etc.), there is a need to extend the IS-634 to support these new requirements.

Figure 1:
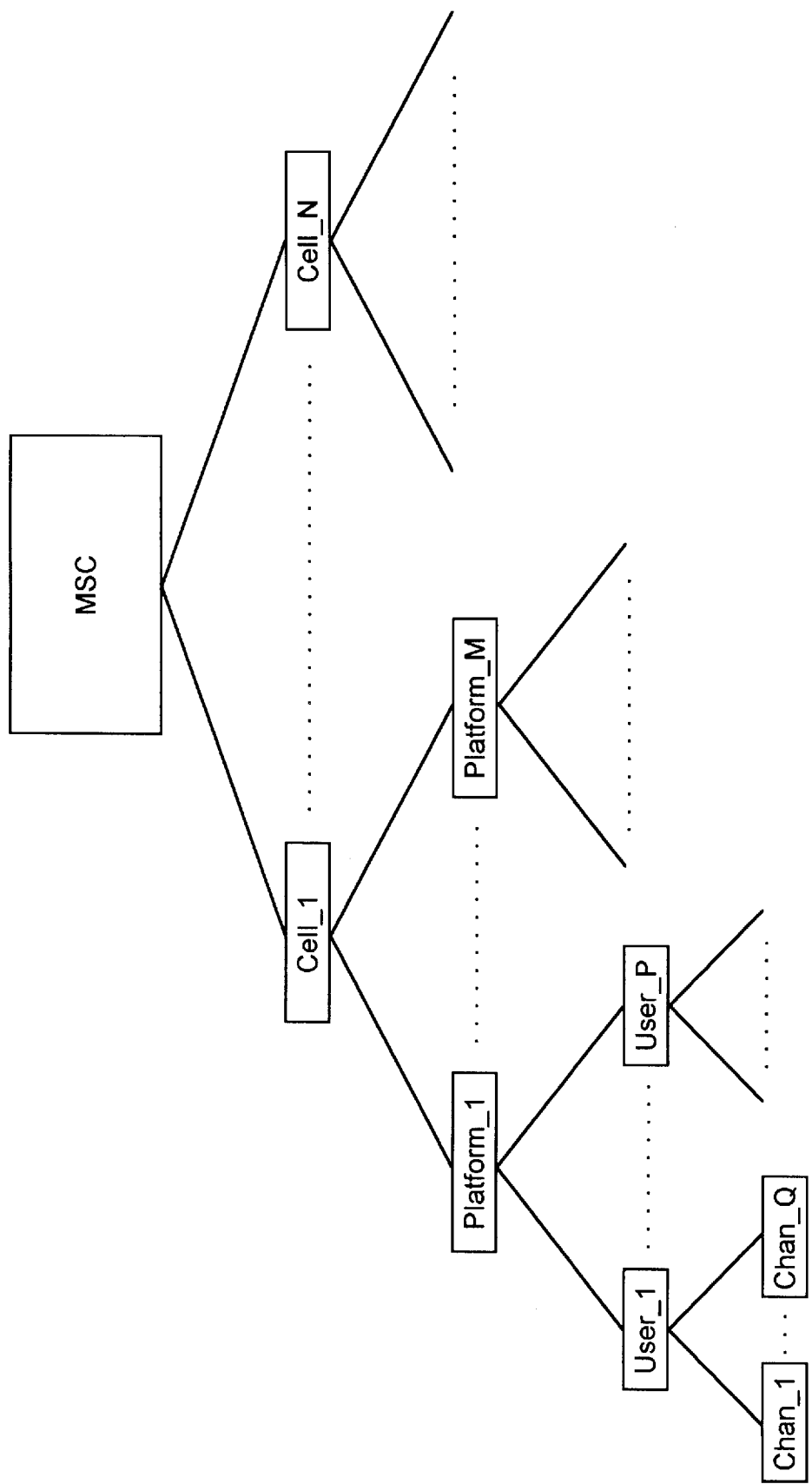
FIG. 1 depicts a cellular network showing several cells and an MSC.

FIG. 1 represents a hierarchy that should be included in the IS-634 protocol to support multi-user mobile platforms with multi-channel services. The MSC should be able to handle N cells. Each cell may have up to M mobile platforms. Each platform may carry up to P active users. Each user may request a service which requires up to Q radio channels.

This specification describes some possibilities to extend the IS-634 standard to support DCA in case of single- and multi-channel services, and single- and multi-user mobile platforms in omni- and sectorized cellular networks. This extension is based on the already existing IS-634, and only new items will be presented.

2. Extension of IS-634 for Dynamic Channel Allocation with Single- and Multi-Channel Services In this section, we describe how to extend/modify the already existing IS-634 protocol flow to support dynamic channel allocation. Most of the signaling messages remain the same as in the original IS-634 standard. Only their internal structure should be modified, as will be described in Section 3.

Dynamic channel allocation is executed in the MSC. When the MSC determines which channel(s) is/are available for a call, it allocates the channel(s) to the BS using the already existing IS-634 "Assignment Request" message. In case of handoff, the MSC allocates a channel(s) to the target BS by sending the already existing IS-634 "Handoff Request" message to the target BS. When the MSC wants to release a channel(s) in a BS, it sends the already existing IS-634 "Clear Command" message to the BS.

2.1 Mobile Origination

This section describes the extension of IS-634 for ANSI/EIA/TIA-553 Mobile Origination, referring to Section 2.2.1.19 of the TR-45 document "MSC-BS Interface for Public 800 MHz; Call Processing and Supplementary Services" (PN-3361-2, Ballot Version).

2.1.1 Mobile Origination—Successful Channel Allocation

Figure 2:
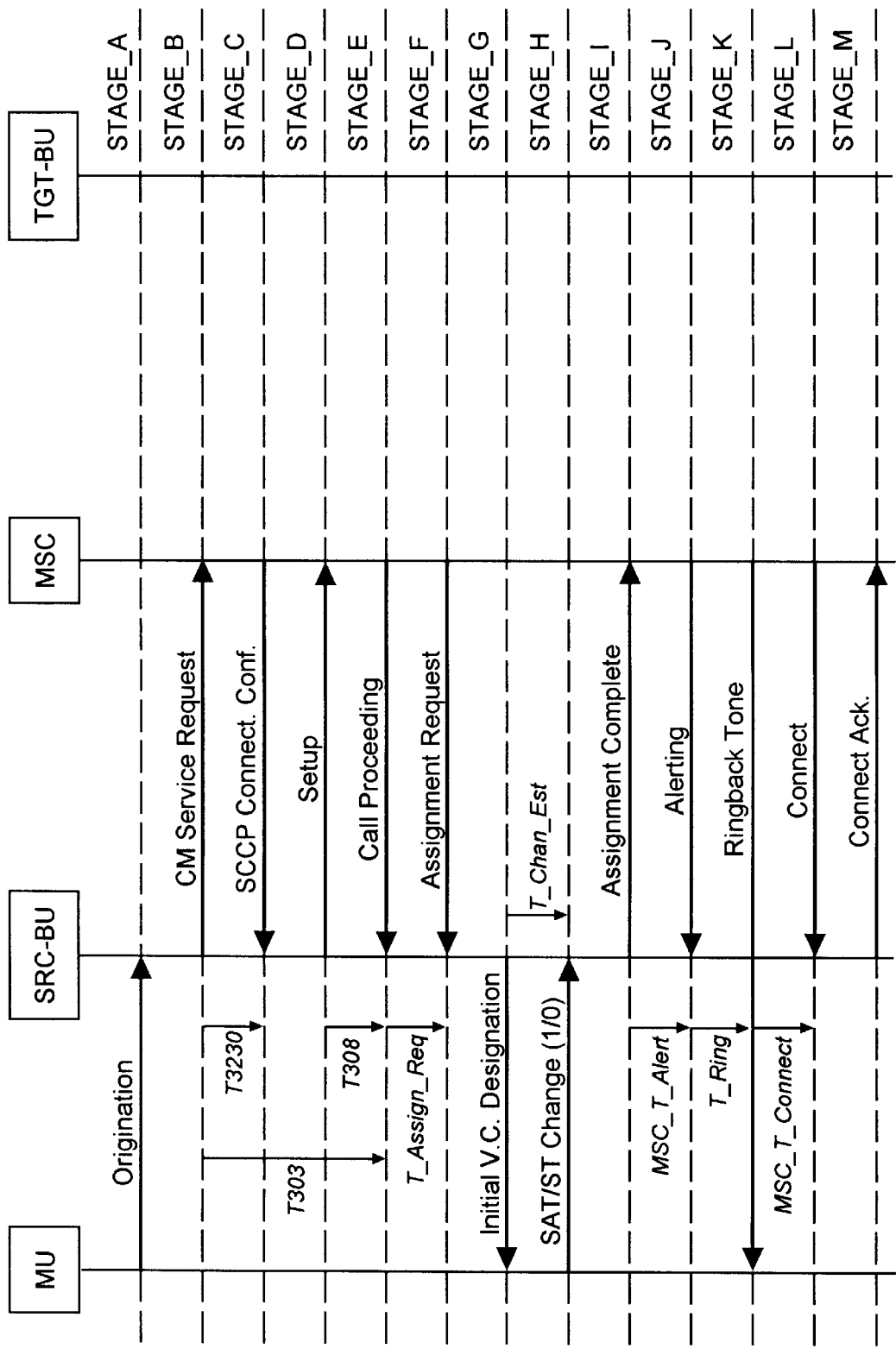
FIG. 2 depicts a flowchart of the IS634 protocol for mobile organization.

The original IS-634 protocol flow for Mobile Origination—Successful Channel Allocation is given in FIG. 2.

The recommended extension of IS-634 call flow for successful Mobile Origination is as follows for the various stages:

A–D Remains the same as is already proposed by IS-634.

E The MSC executes the DCA algorithm to find (an) available radio channel(s) for the new call. If there is/are (an) available radio channels, the MSC sends a "Call Proceeding" message to the BS, as is already proposed by IS-634.

F The MSC sends an "Assignment Request" message to the BS to allocate the available radio channel(s) to the new call. The MSC starts timer T10 upon sending of the "Assignment Request" message.

G Upon receipt of the "Assignment Request" message from the MSC, the BS connects the full audio path to the designated terrestrial circuit, i.e. tunes its radio equipment and DSP circuits to the allocated channel(s).

G–M Remains the same as is already proposed by IS-634.

2.1.2 Mobile Origination—Unsuccessful Channel Allocation

Figure 3:
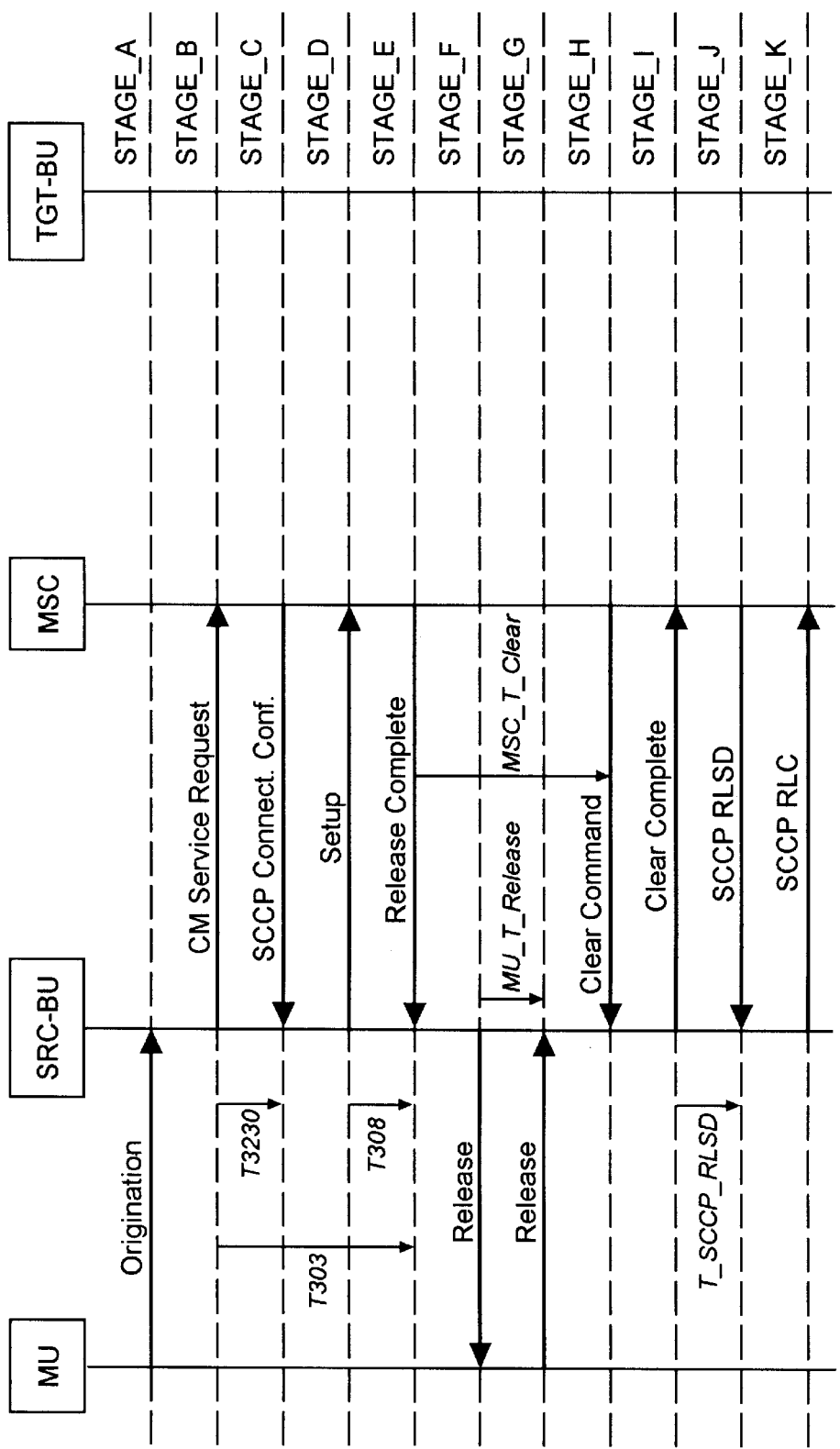
FIG. 3 depicts a flowchart of the IS634 protocol for mobile organization.

The original IS-634 protocol flow for Mobile Origination—Unsuccessful Channel Allocation is given in FIG. 3.

The proposed extension of the IS-634 standard call flow for unsuccessful Mobile Origination is as follows for the various stages:

A–D Remains the same as is already proposed by IS-634.

E The MSC executes the DCA algorithm to find an available radio channel(s) for the new call. If there is/are no available radio channel(s), the MSC sends a "Release Complete message to the BS, as is already proposed by IS-634, Section 2.3.6.3 of the TR-45 document "MSC-BS Interface for Public 800 MHz: Call Processing and Supplementary Services", PN-3361-2, Ballot Version, (Call Clear Initiated by MSC, Scenario II, steps d–j).

Figure 4:
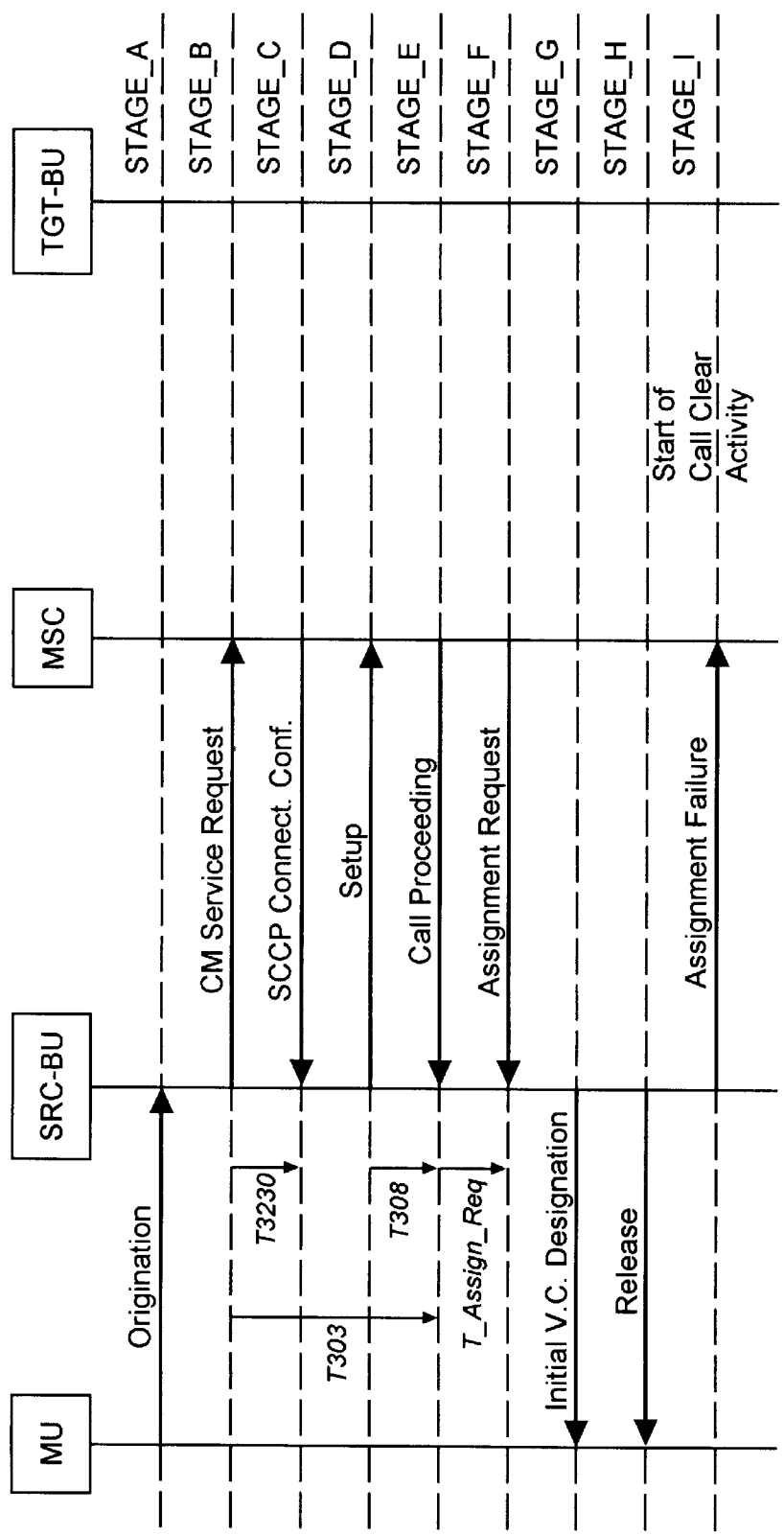
FIG. 4 depicts a flowchart of the IS634 protocol for mobile organization.

2.1.3 Mobile Origination—Unsuccessful Channel Allocation due to Failure in the BS The original IS-634 protocol flow for Mobile Origination—Unsuccessful Channel Allocation Due to Failure In The BS is given in FIG. 4.

The proposed extension of the IS-634 standard call flow for Unsuccessful Mobile Origination Due to Failure In The BS is as follows for the various stages:

A–D Remains the same as is already proposed by IS-634.

E The MSC executes the DCA algorithm to find an available radio channel(s) for the new call. If there is an available radio channel(s), the MSC sends a "Call Proceeding" message to the BS, as is already proposed by IS-634.

F The MSC sends an "Assignment Request" message to the BS to allocate the available radio channel(s) to the new call. The MSC starts timer T10 upon sending of the "Assignment Request" message.

G Upon receipt of the "Assignment Request" message from the MSC, the BS tries to connect the full audio path to the designated terrestrial circuit, i.e. tries to tune its radio equipment and DSP circuits to the allocated channel(s).

H The BS sends the "Release" message to the MS because it did not tune to the allocated voice channel.

I The BS sends an "Assignment Failure" message to the MSC to indicate that the requested assignment procedure could not be successfully completed. The MSC executes the DCA procedure to release the radio channel that has been allocated for the call. Next actions are already proposed by IS-634, Section 2.2.1.11 of the TR-45 document "MSC-BS Interface for Public 800 MHz: Call Processing and Supplementary Services", PN-3361-2, Ballot Version.

2.2 Mobile Terminated Call

This section describes the extension of IS-634 for ANSI/EIA/TIA-553 Mobile Terminated Call (Paging), referring to Section 2.2.2.17 of the TR-45 document "MSC-BS Interface for Public 800 MHz: Call Processing and Supplementary Services" (PN-3361-2, Ballot Version).

2.2.1 Mobile Terminated Call—Successful Channel Allocation

Figure 5:
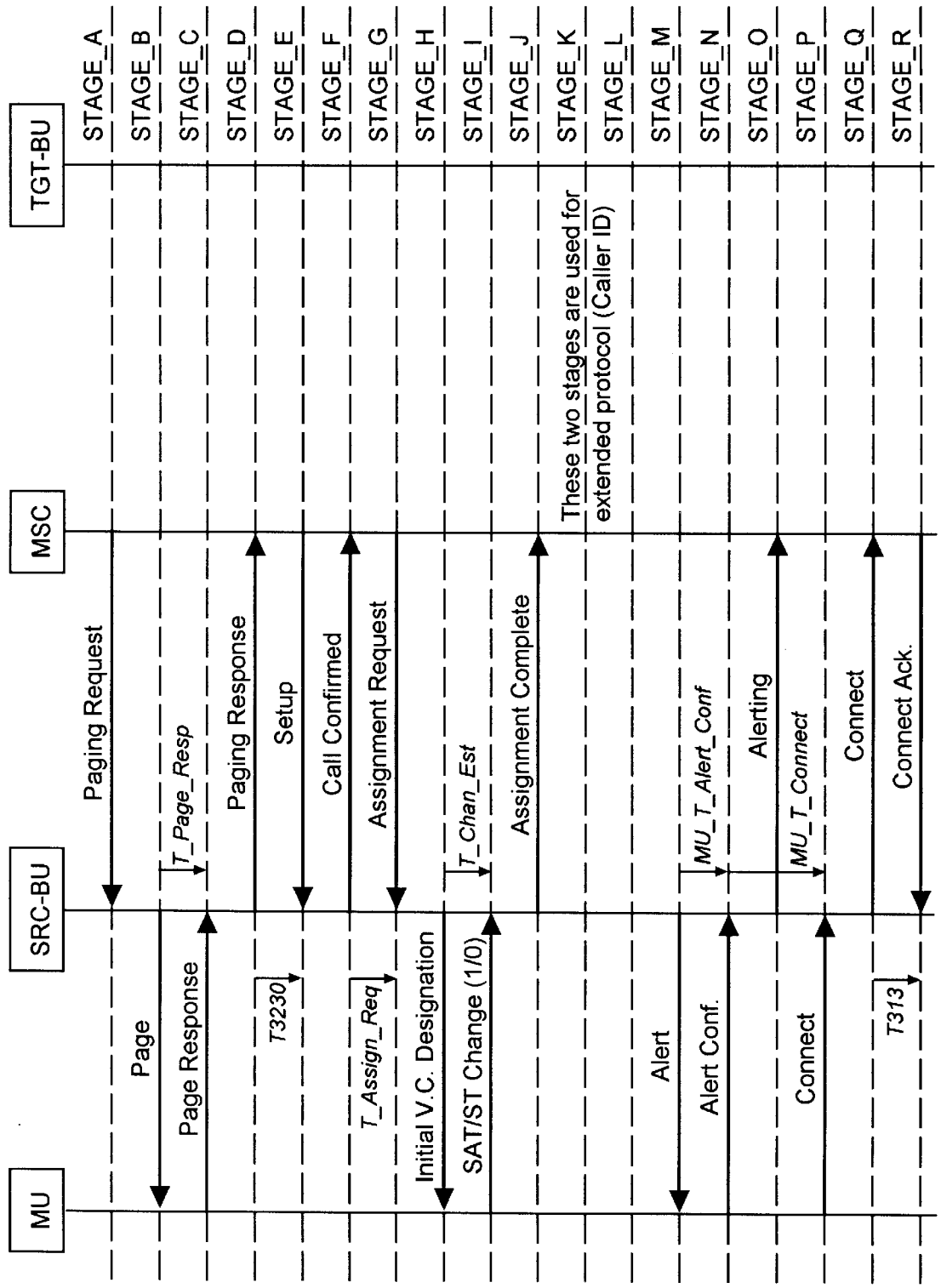
FIG. 5 depicts a flowchart of the IS634 protocol for mobile organization.

The original IS-634 protocol flow for Mobile Terminated Call—Successful Channel Allocation is given in FIG. 5.

The proposed extension of the IS-634 standard call flow for a successful Mobile Terminated Call may be as follows for the various stages:

- A The MSC executes the DCA algorithm to find an available radio channel(s) for the new call. If there is an available radio channel(s), the MSC continues with steps a–f, as is already proposed by IS-634.
- A–F Remains the same as is already proposed by IS-634.
- G The MSC sends an "Assignment Request" message to the BS to allocate the available radio channel(s) to the new call. The MSC starts timer T10 upon sending of the "Assignment Request" message.
- H Upon receipt of the "Assignment Request" message with the allocated channel(s) from the MSC, the BS connects the full audio path to the designated terrestrial circuit, i.e. tunes its radio equipment and DSP circuits to the allocated channel(s).
- H–R Remains the same as is already proposed by IS-634.

2.2.2 Mobile Terminated Call—Unsuccessful Channel Allocation

The proposed extension of the IS-634 standard call flow for unsuccessful Mobile Terminated Call is as follows for the various stages:

- A When a call request comes from a landline port, the MSC executes the DCA algorithm to find an available radio channel(s) for the new call. If there is no available radio channel(s), the MSC does not continue the processing (paging) for this call.

Figure 6:
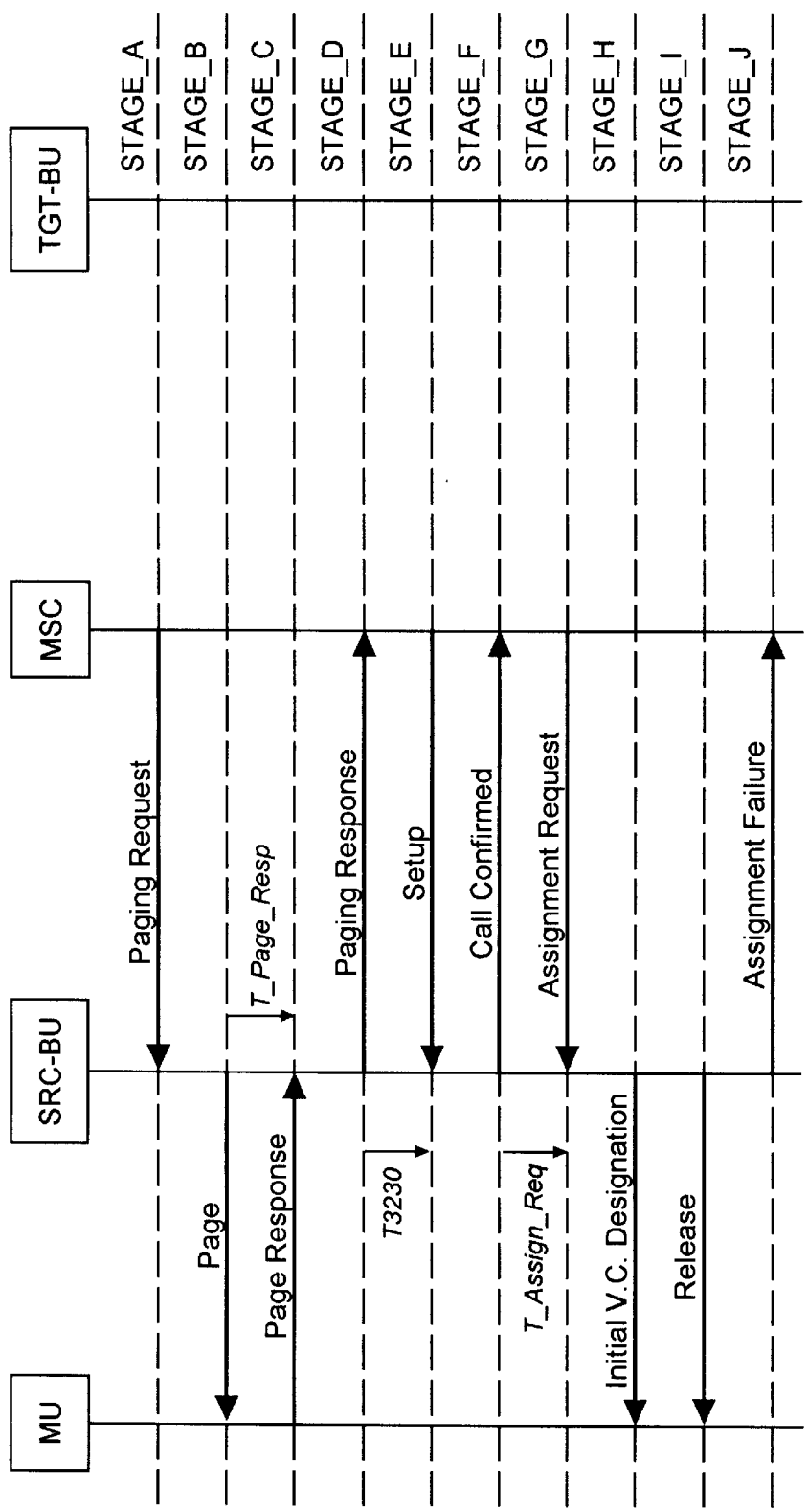
FIG. 6 depicts a flowchart of the IS634 protocol for mobile organization.

2.2.3 Mobile Terminated Call—Unsuccessful Channel Allocation due to Failure in the BS The original IS-634 protocol flow for Mobile Terminated Call—Unsuccessful Channel Allocation due to Failure in the BS is given in FIG. 6.

The proposed extension of the IS-634 call flow for unsuccessful Mobile Terminated Call due to Failure in the BS is as follows for the various stages:

- A The MSC executes the DCA algorithm to find an available radio channel(s) for the new call. If there is an available radio channel(s), the MSC continues with steps a–f, as is already proposed by IS-634.
- A–F Remains the same as is already proposed by IS-634.
- G The MSC sends an "Assignment Request" message to the BS to allocate the available radio channel(s) to the new call. The MSC starts timer T10 upon sending of the "Assignment Request" message.
- H Upon receipt of the "Assignment Request" message from the MSC, the BS tries to connect the full audio path to the designated terrestrial circuit, i.e. tries to tune its radio equipment and DSP circuits to the allocated channel(s).
- I The BS sends the "Release" message to the MS because it did not tune to the allocated radio channel.
- J The BS sends an "Assignment Failure" message to the MSC to indicate that the requested assignment procedure could not be successfully completed. The MSC executes DCA to release the allocated radio channel(s) for the call. Next actions are already proposed by IS-634, Section 2.2.1.11 of the TR-45 document "MSC-BS Interface for Public 800 MHz: Call Processing and Supplementary Services", PN-3361-2, Ballot Version.

2.3 Inter-BS Handoff

This section describes the extension of IS-634 for ANSI/EIA/TIA-553 Handoff, referring to Section 3.3 of the TR-45 document "MSC-BS Interface for Public 800 Mhz: Call Processing and Supplementary Services" (PN-3361-2, Ballot Version).

Note that there is no need for exchange of the "Strength Measurement Request" and "Strength Measurement Response" messages between the MSC and BSs because the MSC already has the information on channel availability and possible co-channel and adjacent-channel interference.

2.3.1 Inter-BS Handoff—Successful Channel Allocation

Figure 7:
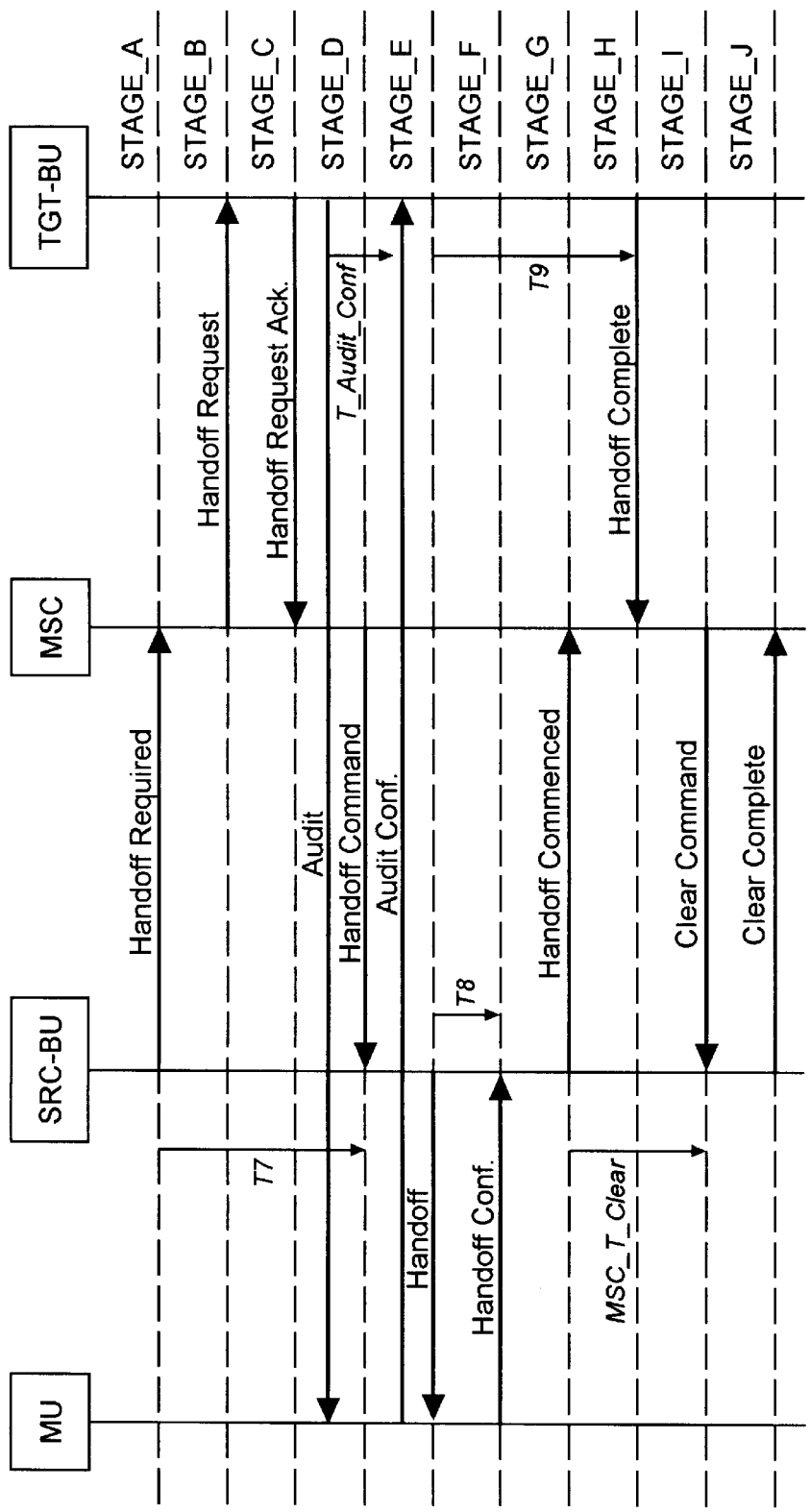
FIG. 7 depicts a flowchart of the IS634 protocol for mobile organization.

The original IS-634 protocol flow for Inter-BS Handoff—Successful Channel Allocation is given in FIG. 7.

The proposed extension of the IS-634 standard call flow for an Inter-BS Handoff is as follows (referring to Section 3.3.4.1.1 of the TR-45 document "MSC-BS Interface for Public 800 Mhz: Call Processing and Supplementary Services" (PN-3361-2, Ballot Version)) for the various stages:

- A The MSC receives the "Handoff Required" message from a BS when the BS detects degradation of the signal coming from an MS.
- B The MSC executes the DCA algorithm to find an available radio channel(s) for the call in the target cell. If there is an available radio channel(s), the MSC sends a "Handoff Request" message to the target BS.
- C–H Remains the same as is already proposed by IS-634 (steps j–o).
- I The MSC releases the radio channel(s) allocated to the call in the source cell. The MSC sends a "Clear Command" message to the source BS.
- J Remains the same as is already proposed by IS-634.

2.3.2 Inter-BS Handoff Fail: Mobile Remains on Source

Figure 8:
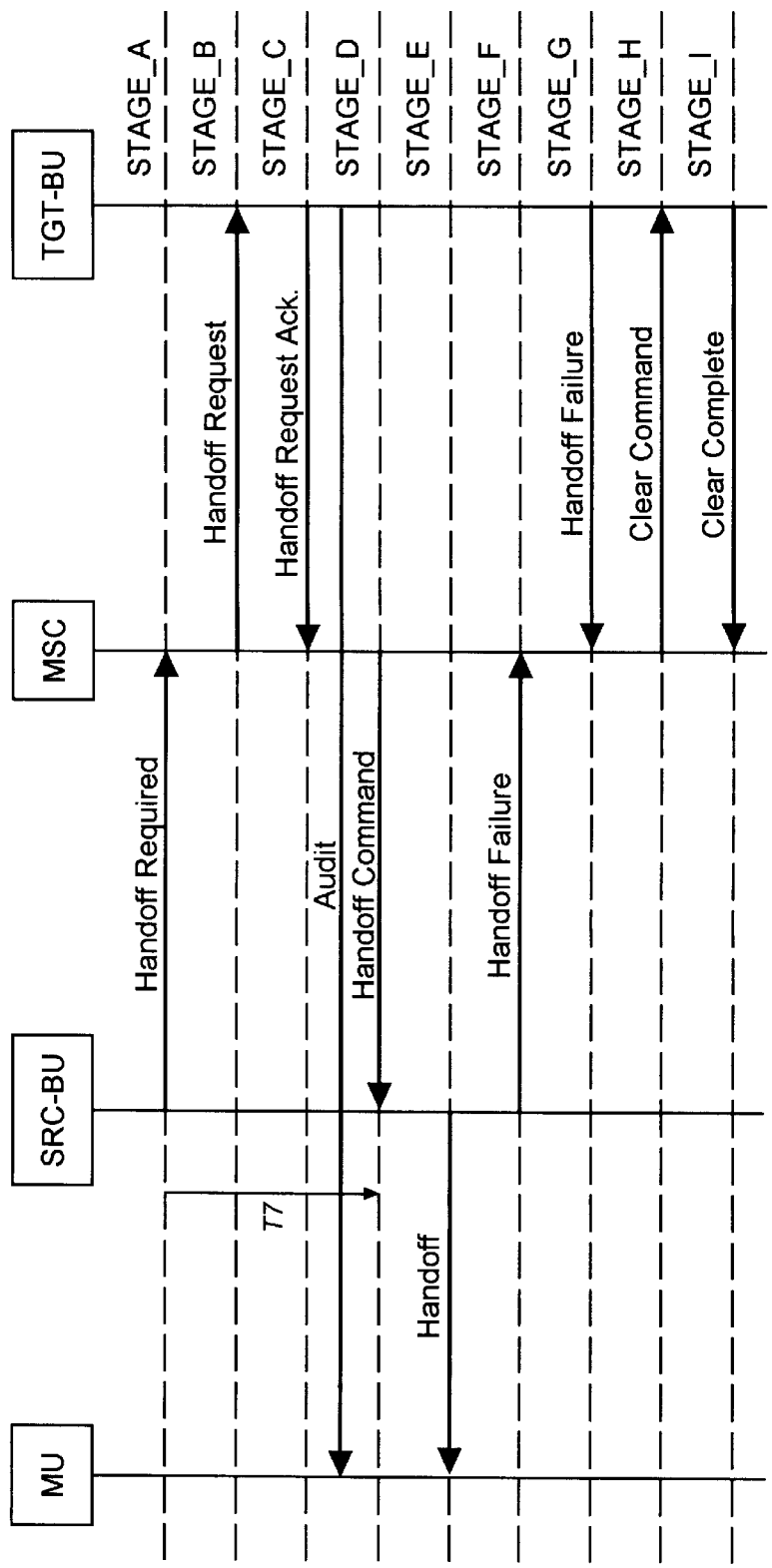
FIG. 8 depicts a flowchart of the IS634 protocol for mobile organization.

The original IS-634 protocol flow for Inter-BS Handoff Fail: Mobile Remains on Source is given in FIG. 8.

The proposed extension of the IS-634 standard call flow for an Inter-BS Handoff Fail: Mobile Remains on Source may be modified as follows (referring to Section 3.3.4.1.4 of the TR-45 document "MSC-BS Interface for Public 800 Mhz: Call Processing and Supplementary Services" (PN-3361-2, Ballot Version)) for the various stages:

- A Remains the same as is already proposed by IS-634.
- B The MSC executes the DCA algorithm to find an available radio channel(s) for the call in the target cell. If there is an available radio channel(s), the MSC sends a "Handoff Request" message with the allocated channel(s) to the target BS.
- C–G Remains the same as is already proposed by IS-634.
- H The MSC releases the radio channel(s) allocated to the call in the target cell because the handoff was not successful and the MS remains in the source cell. The MSC sends a "Clear Command" message to the target BS.
- I Remains the same as is already proposed by IS-634.

2.3.3 Inter-BS Handoff Fail: Mobile Did Not Get To Target

Figure 9:
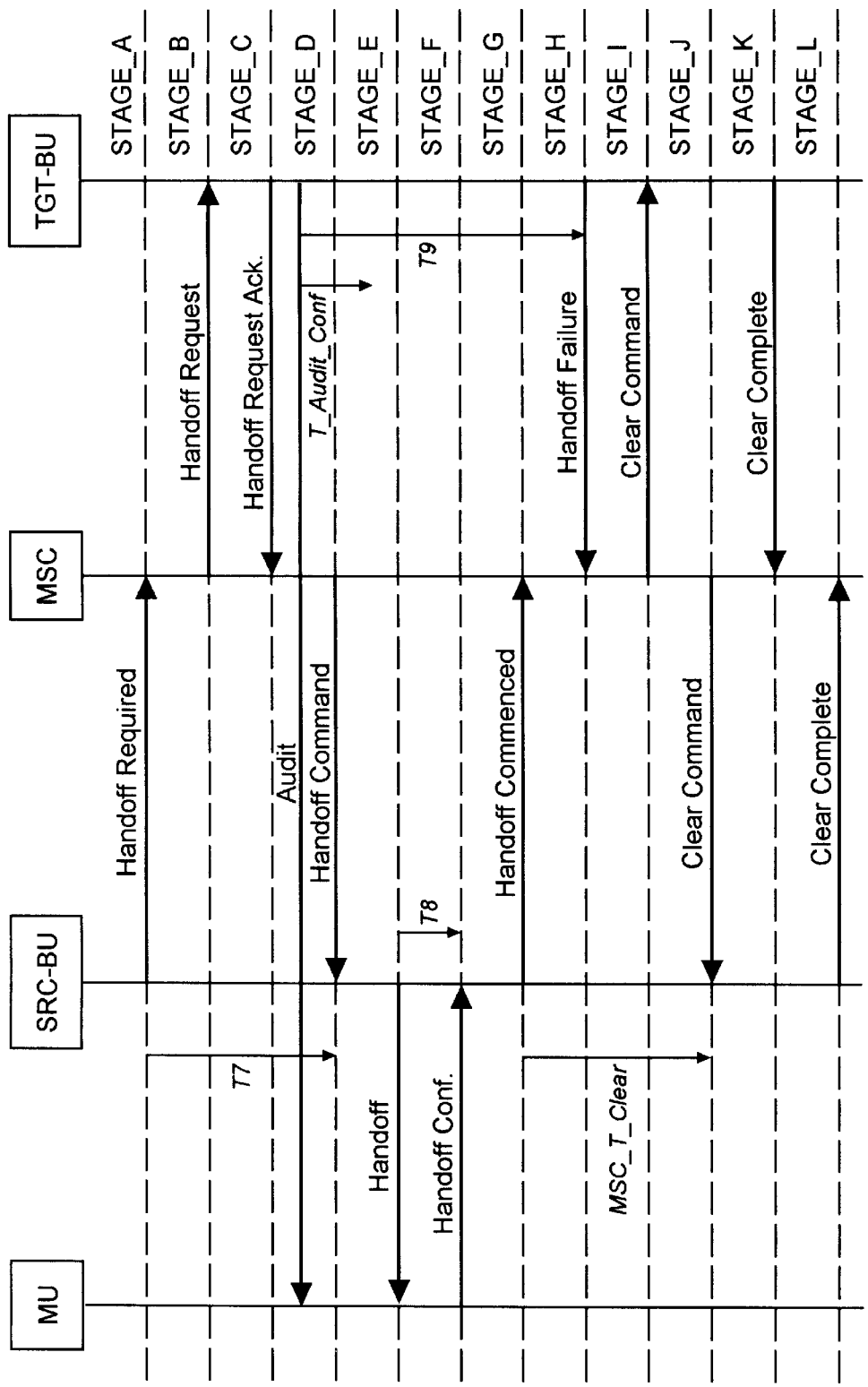
FIG. 9 depicts a flowchart of the IS634 protocol for mobile organization.

The original IS-634 protocol flow for Inter-BS Handoff Fail: Mobile Did Not Get To Target is given in FIG. 9.

The proposed extension to the original IS-634 standard call flow for an Inter-BS Handoff Fail: Mobile Did Not Get To Target is as follows (referring to Section 3.3.4.1.5 of the TR-45 document "MSC-BS Interface for Public 800 Mhz: Call Processing and Supplementary Services" (PN-3361-2, Ballot Version)) for the various stages:

- A Remains the same as is already proposed by IS-634.
- B The MSC executes the DCA algorithm to find an available radio channel(s) for the call in the target cell.

If there is an available radio channel(s), the MSC sends a "Handoff Request" message to the target BS.

C–H Remains the same as is already proposed by IS-634.

I The MSC releases the radio channel(s) allocated to the call in the target cell because the mobile did not get to target cell. The MSC sends a "Clear Command" message to the target BS.

J The MSC releases the radio channel(s) allocated to the call in the source cell because the mobile is not any more in the source cell. The MSC sends a "Clear Command" message to the source BS.

K–L Remains the same as is already proposed by IS-634.

2.3.4 Inter-BS Handoff Fail: Source Timeout Waiting For Clear

Figure 10:
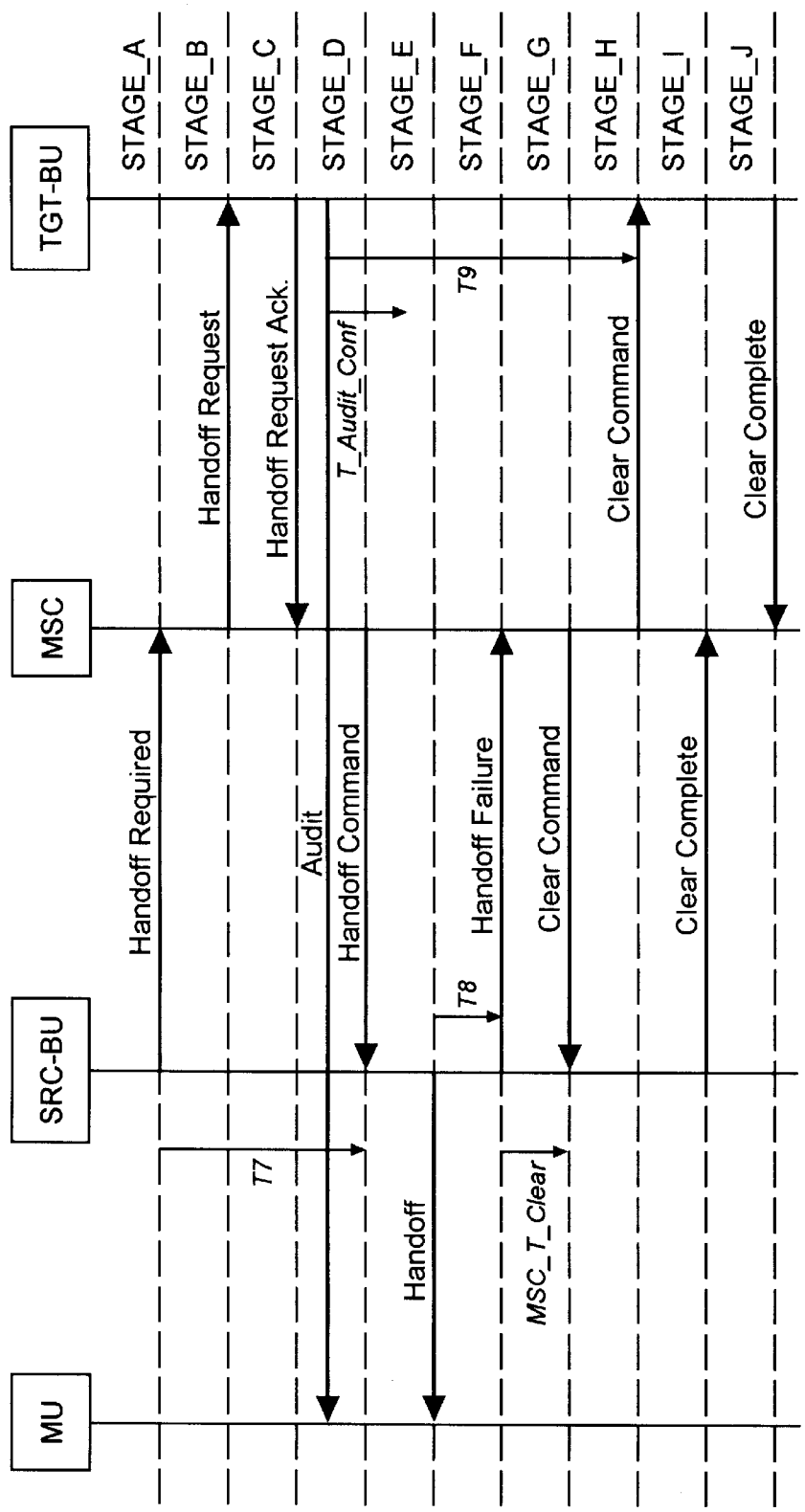
FIG. 10 depicts a flowchart of the IS634 protocol for mobile organization.

The original IS-634 protocol flow for Inter-BS Handoff Fail: Source Timeout Waiting For Clear is given in FIG. 10.

The recommended extension of the original IS-634 standard call flow for an Inter-BS Handoff Fail: Source Timeout Waiting For Clear is as follows (referring to Section 3.3.4.1.6 of the TR-45 document "MSC-BS Interface for Public 800 MHz: Call Processing and Supplementary Services" (PN-3361-2, Ballot Version)) for the various stages:

A Remains the same as is already proposed by IS-634.

B The MSC executes the DCA algorithm to find an available radio channel(s) for the call in the target cell. If there is an available radio channel(s), the MSC sends a "Handoff Request" message with the allocated channel(s) to the target BS to allocate the radio channel.

C–F Remains the same as is already proposed by IS-634.

G The MSC releases the radio channel(s) allocated to the call in the target cell because the mobile did not get to target cell. The MSC sends a "Clear Command" message to the target BS.

H The MSC releases the radio channel(s) allocated to the call in the source cell because the mobile is not any more in the source cell. The MSC sends a "Clear Command" message to the source BS.

I The target BS sends a "Clear Complete" message to the MSC to indicate the release of the resources.

J The source BS sends a "Clear Complete" message to the MSC to indicate the release of the resources.

2.3.5 Inter-BS Handoff Fail: No Resources Available At Targets

Figure 11:
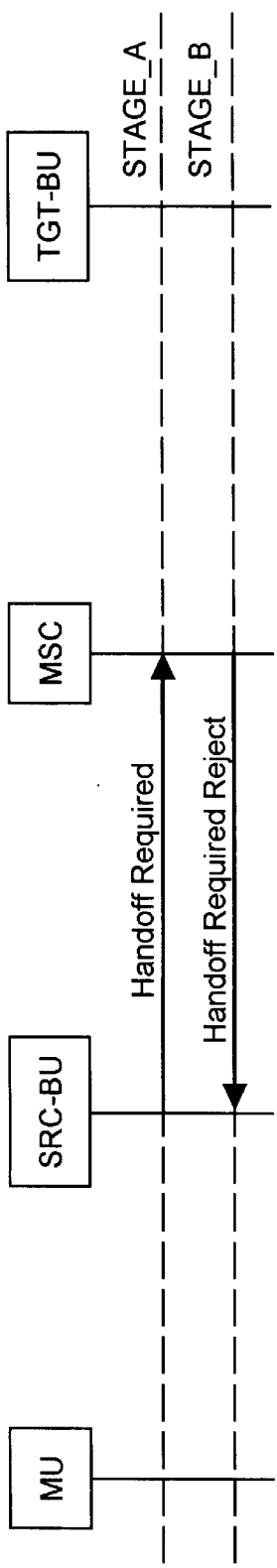
FIG. 11 depicts a flowchart of the IS634 protocol for mobile organization.

The original IS-634 protocol flow for Inter-BS Handoff Fail: No Resources Available At Targets is given in FIG. 11.

The recommended extension of the original IS-634 standard call flow for an Inter-BS Handoff Fail: No Resources Available At Targets is as follows (referring to Section 3.3.4.1.7 of the TR-45 document "MSC-BS Interface for Public 800 MHz: Call Processing and Supplementary Services" (PN-3361-2, Ballot Version)) for the various stages:

A The MSC receives a "Handoff Required" message from a source BS.

B The MSC executes the DCA algorithm to find an available radio channel(s) for the call in the target cell. If there is an available radio channel(s) in the target cell, the MSC sends a "Handoff Required Reject" message to the source BS.

Notice that there is no need for the MSC to scan all possible target BSs with "Handoff Request" messages and to wait for their responses ("Handoff Failure" messages) because all the information on current channel availability is centralized in the MSC.

2.4 Call Clear

This section describes the extension of IS-634 for ANSI/EIA/TIA-553 Call Clear, referring to Section 2.3 of the TR-45 document "MSC-BS Interface for Public 800 MHz: Call Processing and Supplementary Services" (PN-3361-2, Ballot Version).

2.4.1 Call Clear Initiated by MS

Figure 12:
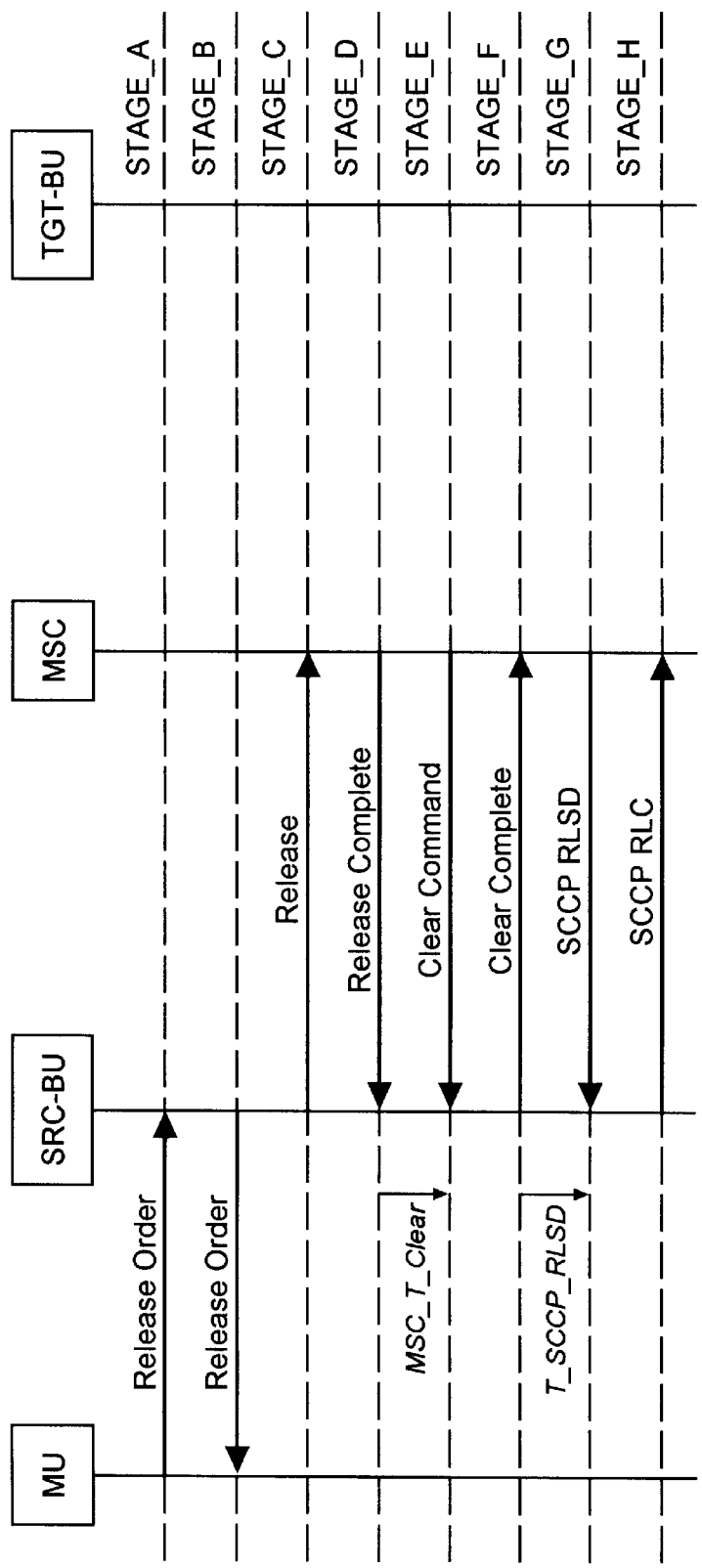
FIG. 12 depicts a flowchart of the IS634 protocol for mobile organization.

The original IS-634 protocol flow for Call Clear Initiated By MS is given in FIG. 12.

The recommended extension of the original IS-634 standard call flow for a Call Clear Initiated by MS is as follows (referring to Section 2.3.6.1 of the TR-45 document "MSC-BS Interface for Public 800 MHz: Call Processing and Supplementary Services" (PN-3361-2, Ballot Version)) for the various stages:

A–D Remains the same as is already proposed by IS-634.

D The MSC executes the DCA algorithm to release radio channel(s) that have been allocated to the call.

E The MSC sends a "Clear Command" message to the BS to instruct the BS to release the associated dedicated resource (terrestrial circuit and radio channel).

E–H Remains the same as is already proposed by IS-634.

2.4.2 Call Clear Initiated by BS

Figure 13:
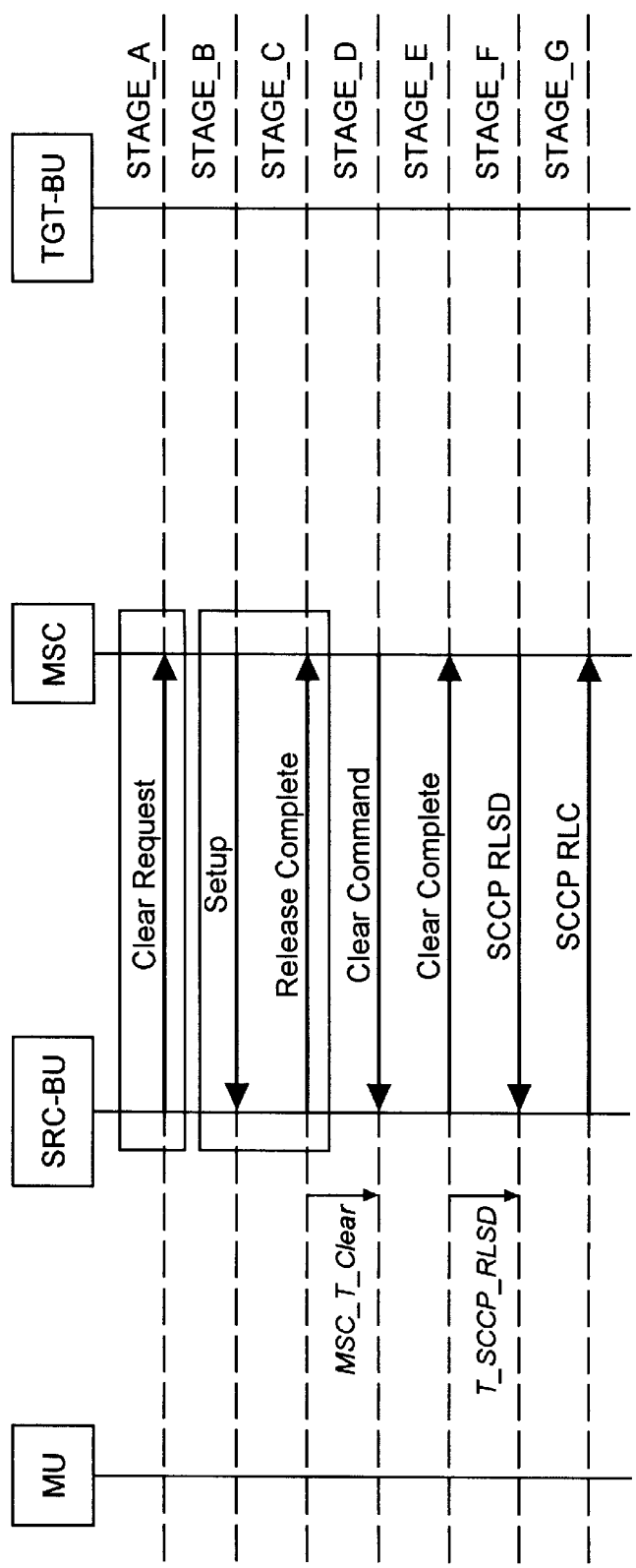
FIG. 13 depicts a flowchart of the IS634 protocol for mobile organization.

The original IS-634 protocol flow for Call Clear Initiated By BS is given in FIG. 13.

The recommended extension of the original IS-634 standard call flow for a Call Clear Initiated by BS is as follows (referring to Section 2.3.6.2 of the TR-45 document "MSC-BS Interface for Public 800 MHz: Call Processing and Supplementary Services" (PN-3361-2, Ballot Version)) for the various stages:

A–C Remains the same as is already proposed by IS-634.

D The MSC executes the DCA algorithm to release radio channel(s) that have been allocated to the call. The MSC sends a "Clear Command" message to the BS to instruct the BS to release the associated dedicated resource (terrestrial circuit and radio channel).

E–G Remains the same as is already proposed by IS-634.

2.4.3 Call Clear Initiated by MSC

Figure 14:
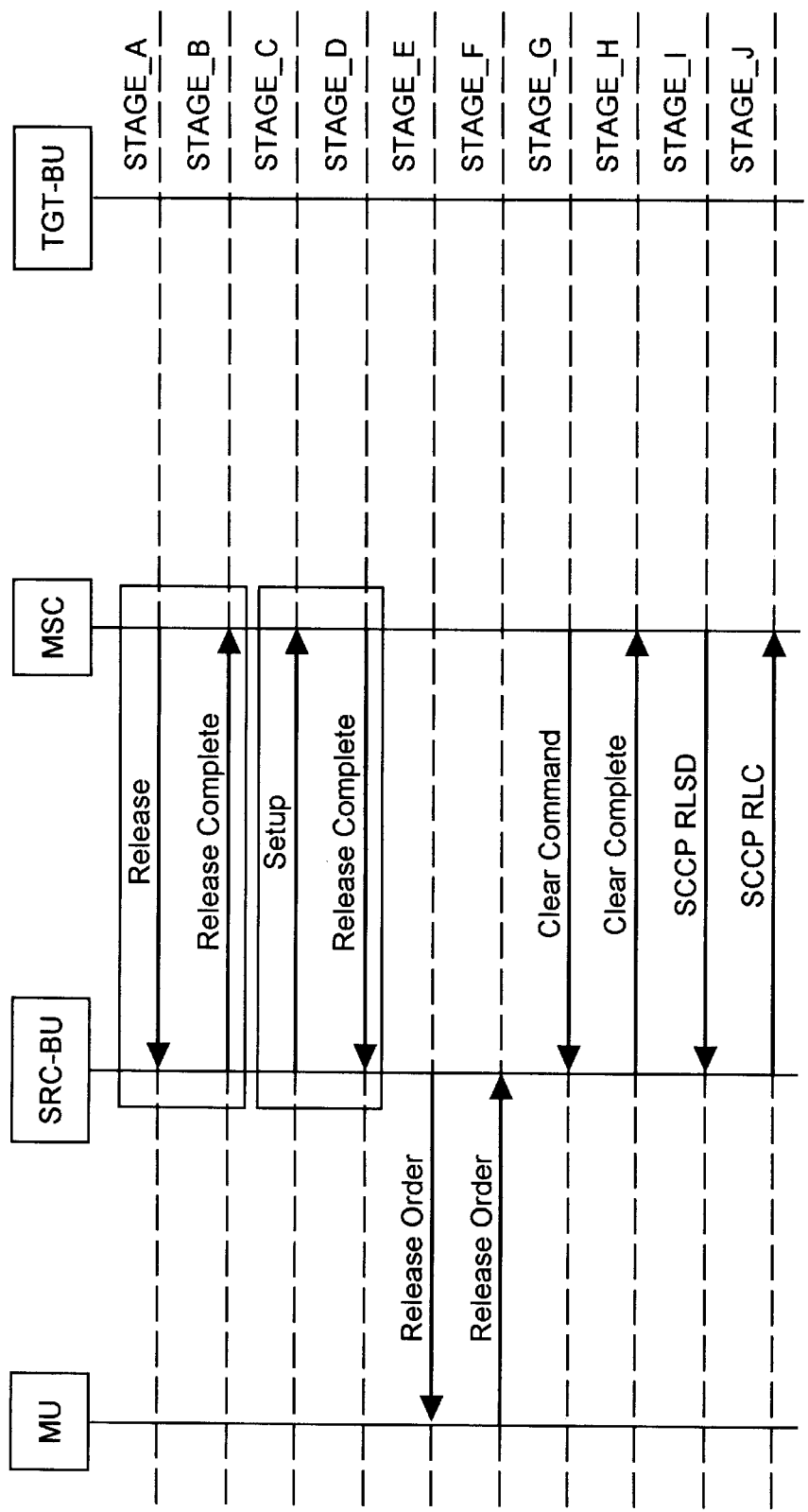
FIG. 14 depicts a flowchart of the IS634 protocol for mobile organization.

The original IS-634 protocol flow for Call Clear Initiated By MSC is given in FIG. 14.

The recommended extension of the original IS-634 standard call flow for a Call Clear Initiated by MSC is as follows (referring to Section 2.3.6.3 of the TR-45 document "MSC-BS Interface for Public 800 MHz: Call Processing and Supplementary Services" (PN-3361-2, Ballot Version)) for the various stages:

A–F Remains the same as is already proposed by IS-634.

G The MSC executes the DCA algorithm to release radio channel(s) that have been allocated to the call. The MSC sends a "Clear Command" message to the BS to instruct the BS to release the associated dedicated resource (terrestrial circuit and radio channel).

G–J Remains the same as is already proposed by IS-634.

3. Modified IS-634 Message Formats

This section will provide recommendations how to modify formats of the already existing IS-634 messages to support:

(a) Dynamic Channel Allocation (DCA)

(b) Multi-User Platforms with Multi-Channel Services (c) Omni and Sectorized Antennas To support DCA, it is necessary to provide channel identifier(s) in "Assignment Request", "Handoff Request", and "Clear Command" messages. However, to support multi-user mobile platforms with multi-channel services requires a reorganization of some information elements that are transferred between the MSC and BSs.

3.1 Modification in the "Assignment Request" Message

To support DCA with multi-user platforms requesting multi-channel services, the IS-634 standard "Assignment Request" message may be modified in the following way:

The possible information elements of the "Assignment Request" message are:

(a) Message Type
(b) Cell Identifier
(c) Platform Identifier
(d) User Information The first two information elements are the same as those proposed by IS-634, Section 2.2.1.9 of the TR-45 document "MSC-BS Interface for Public 800 MHz: Call Processing and Supplementary Services", PN-3361-2, Ballot Version.

The "Platform Identifier" information element denotes the platform that carries the user who tries to establish a phone call.

The "User Information" element contains:

(a) User Identifier
(b) Priority
(c) Signaling Type
(d) Encryption Information
(e) Transcoder Mode
(f) Service Option
(g) Channel Number
(h) Channel List The first four elements of the "User Information" are the same as those proposed by IS-634.

The "Service Option" element denotes the type of service (voice, data, facsimile, video, conference call, etc.) that the user requires.

The "Channel Number" element denotes the number of channels required for the service that the specified user requests.

The "Channel List" element is a pointer to the list of allocated radio channels ("Channel Information" records) for the service that the specified user requests.

Figure 15:
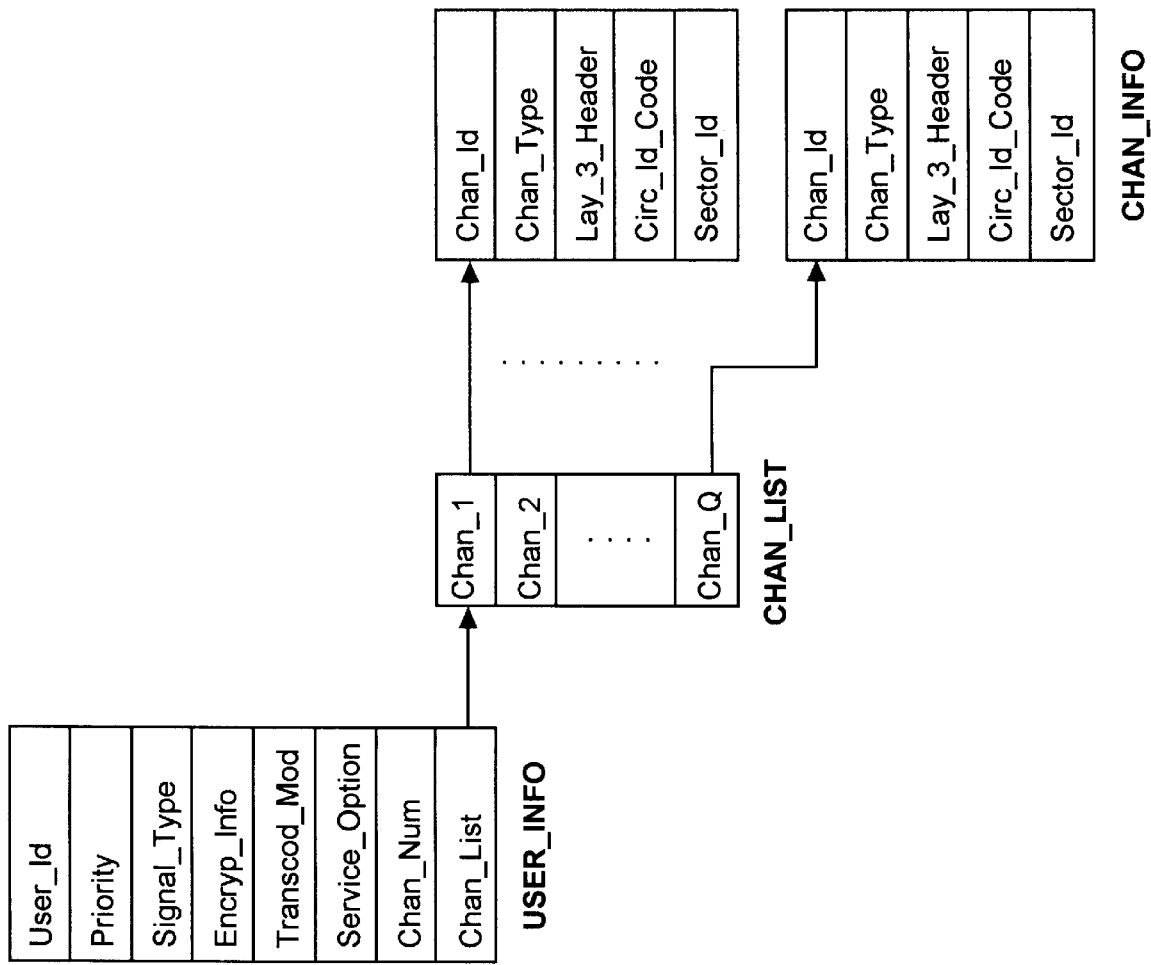
FIG. 15 depicts a data structure for user information.

The "Channel Information" records contain:

(a) Channel Identifier
(b) Channel Type
(c) Layer 3 Header Information
(d) Circuit Identifier Code
(e) Sector Identifier Suggested data structure for the "User Information" information element is presented in FIG. 15.

3.2 Modification in the "Assignment Complete" Message

To support DCA with multi-user platforms requesting multi-channel services, the IS-634 standard "Assignment Complete" message may be modified in the following way:

The possible information elements of the "Assignment Complete" message are:

(a) Message Type
(b) Cell Identifier
(c) Platform Identifier
(d) User Identifier The first two information elements are the same as those proposed by IS-634, Section 2.2.1.10 of the TR-45 document "MSC-BS Interface for Public 800 Mhz: Call Processing and Supplementary Services", PN-3361-2, Ballot Version.

The "Platform Identifier" and "User Identifier" information elements may have the same format as in the "Assignment Request" message.

3.3 Modification in the "Assignment Failure" Message

To support DCA with multi-user platforms with multi-channel services, the IS-634 standard "Assignment Failure" message may be modified in the following way:

The possible information elements of the "Assignment Failure" message are:

(a) Message Type
(b) Cell Identifier
(c) Platform Identifier
(d) User Identifier
(e) Cause
(f) Service Option All the information elements, except for the "Platform Identifier" and "User Identifier", are the same as those proposed by IS-634, Sections 2.2.1.10 and 2.2.1.11 of the TR-45 document "MSC-BS Interface for Public 800 MHz: Call Processing and Supplementary Services", PN-3361-2, Ballot Version.

The "Platform Identifier" and "User Identifier" information elements may have the same format as in the "Assignment Request" message.

3.4 Modification in the "Handoff Request" Message

To support DCA with multi-user platforms with multi-channel services, the IS-634 standard "Handoff Request" message may be modified in the following way:

The possible information elements of the "Handoff Request" message are:

(a) Message Type
(b) Cell Identifier List (Target)
(c) Platform Information
(d) Handoff Power Level
(e) Downlink Radio Environment
(f) Private Parameters All these information elements, except for the "Platform Information", are the same as those proposed by IS-634, Section 3.3.2.3.1 of the TR-45 document "MSC-BS Interface for Public 800 MHz: Call Processing and Supplementary Services", PN-3361-2, Ballot Version:

The "Platform Information" information element contains the following information fields:

(a) Platform Identifier
(b) User Number
(c) User List

The "User Number" information field contains the number of active users (making a phone call) on a mobile platform that requires a handoff.

The "User List" information field contains the list of pointers to the "User Handoff Information" records of the users that are currently active on a mobile platform which requires a handoff.

The "User Handoff Information" records contain:

(a) User Identifier
(b) Priority
(c) Signaling Type
(d) Encryption Information
(e) Transcoder Mode
(f) Classmark Information Type 2
(g) Alert State
(h) Service Option
(i) Channel Number
(j) Channel List The first eight elements are the same as those proposed by IS-634.

The "Channel Number" element denotes the number of channels required for the service that the specified user requests.

The "Channel List" element is a pointer to the list of allocated radio channels ("Channel Handoff Information" records) for the service that the specified user requests.

Figure 16:
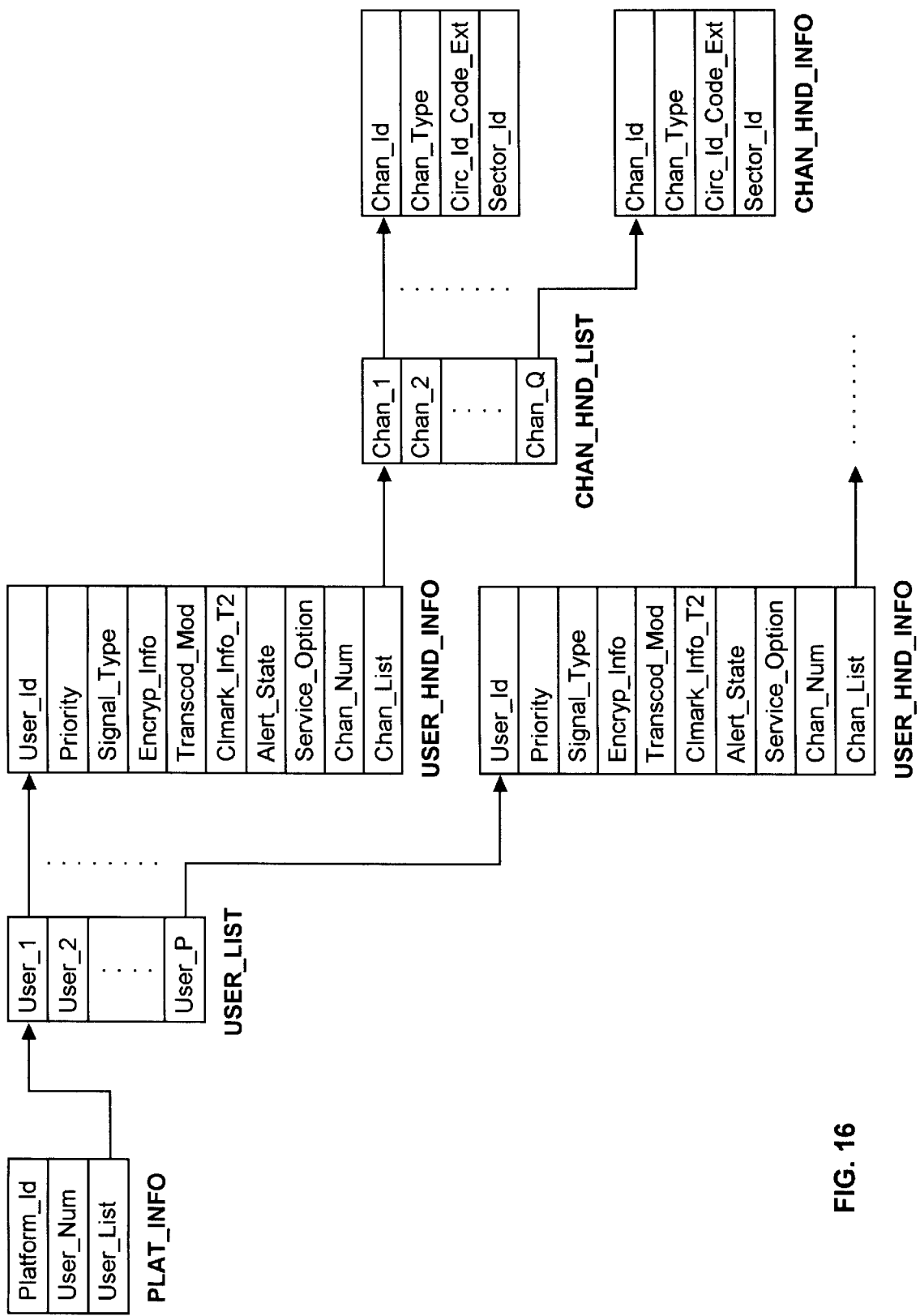
FIG. 16 depicts a data structure for platform information.
Figure 17:
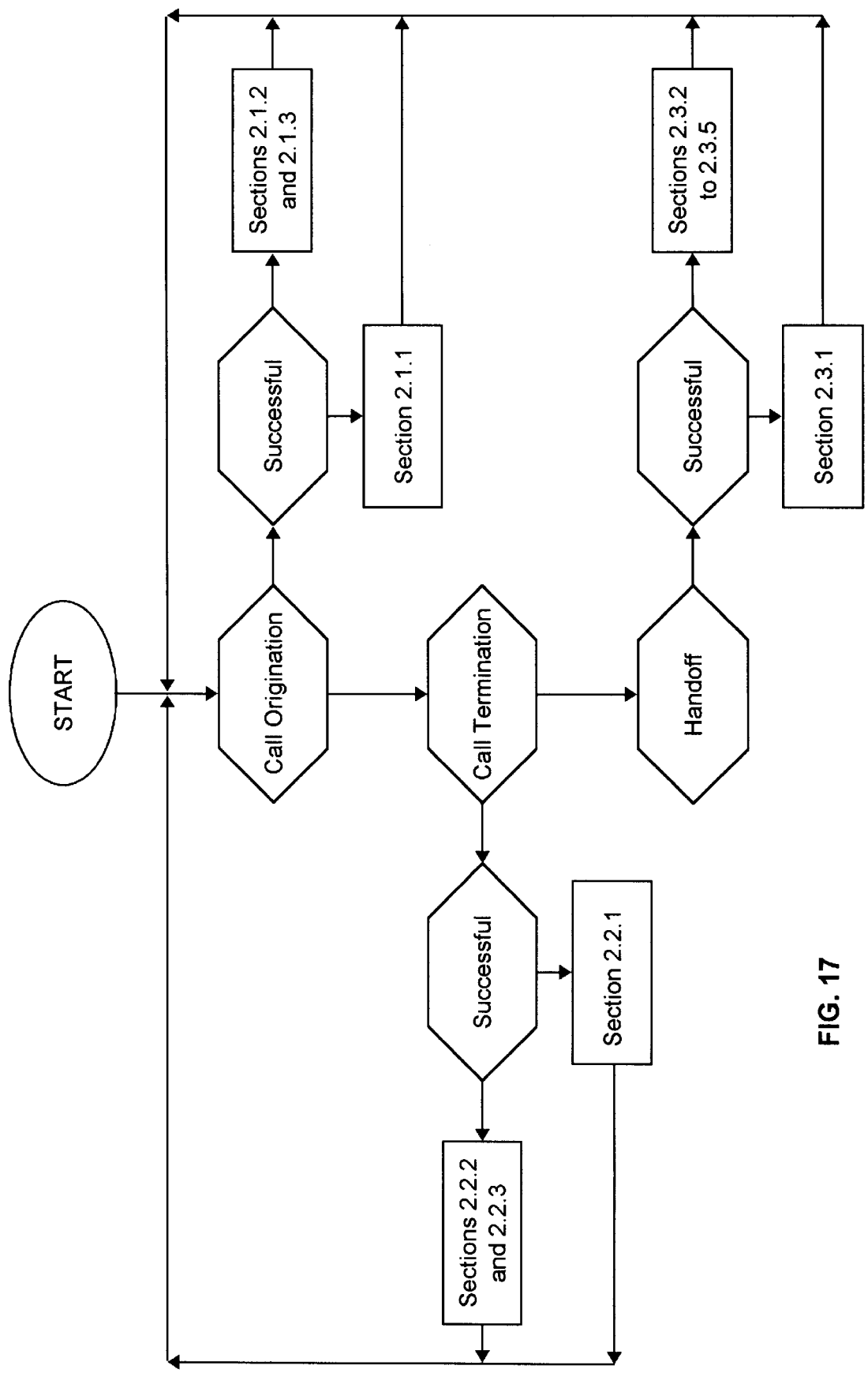
FIG. 17 depicts a flowchart showing a call origination and handoff according to one aspect of the invention.

The "Channel Handoff Information" records contain:
(a) Channel Identifier
(b) Channel Type
(c) Circuit Identifier Code Extension
(d) Sector Identifier Suggested data structure for the "Platform Information" information element is shown in FIG. 16:

3.5 Modification in the "Clear Command" Message

To support DCA with multi-user platforms requesting multi-channel services, the IS-634 standard "Clear Command" message may be modified in the following way:

The possible information elements of the "Clear Command" message are:
(a) Message Type
(b) Platform Identifier
(c) Cause
(d) Circuit Identity Code Extension All the information elements, except for the "Platform Identifier", are the same as those proposed by IS-634, Section 2.3.1.6 of the TR-45 document "MSC-BS Interface for Public 800 MHz: Call Processing and Supplementary Services", PN-3361-2, Ballot Version.

The "Platform Identifier" information element may have the same format as in the "Assignment Request" message.

3.6 Modification In The "Handoff Failure" Message

To support DCA with multi-user platforms requesting multi-channel services, the IS-634 standard "Handoff Failure" message may be modified in the following way:

The possible information elements of the "Handoff Failure" message are:
(a) Message Type
(b) Platform identifier
(c) User Handoff Information
(d) Cause
(e) Circuit Identity Code Extension All the information elements, except for the "Platform identifier" and "User Handoff Information", are the same as those proposed by IS-634, Section 2.3.1.6 of the TR-45 document "MSC-BS Interface for Public 800 MHz: Call Processing and Supplementary Services", PN-3361-2, Ballot Version.

The "Platform Identifier" and "User Handoff Information" information element may have the same format as in the "Handoff Request" message.

3.7 Modification In The "Handoff Performed" Message

To support DCA with multi-user platforms requesting multi-channel services, the IS-634 "Handoff Performed" message may be modified in the following way:

The possible information elements of the "Handoff Performed message are:
(a) Message Type
(b) Platform Identifier
(c) User Handoff Information
(d) Cause All the information elements, except for the "Platform identifier" and "User Handoff Information", are the same as those proposed by IS-634, Section 2.3.1.6 of the TR-45 document "MSC-BS Interface for Public 800 MHz: Call Processing and Supplementary Services, PN-3361-2, Ballot Version.

The "Platform identifier" and "User Handoff Information" information element may have the same format as in the "Handoff Request" message.

3.8 Modification in Other IS-634 Standard Messages

To support DCA and multi-user platforms requesting multi-channel services, some additional IS-634 standard messages require modification.

Messages exchanged during Mobile Origination ("CM Service Request") and Mobile Terminated Call ("Paging Request" and "Paging Response"), which have a "Mobile Identifier" information element in its original form in IS-634, may be used with the "Platform Identifier" and "User Information" elements instead of the "Mobile Identifier" information element.

Messages exchanged during Inter-BS Handoff ("Handoff Required", "Handoff Request Ack", and "Handoff Command"), which have a "Mobile Identifier" information element in its original form in IS-634, may be used with the "Platform Information" elements instead of the "Mobile Identifier" information element.

Advantages of the invention include reduced overhead because all the mobile users are associated with the platform. Other advantages include reduced switching time for the mobile users, which results is improved communication reliability and high quality service to platforms with many mobile users.

This specification incorporates by reference the MSC-BS Interface for Public 800 MHz publication, PN-3361-1 through PN-3361-6 in its entirety. This publication is copyrighted by and available from the Telecommunication Industry Association (1995). The publication outlines the IS-634 interface and related standard information regarding the MSC-BS interface.

Having disclosed exemplary embodiments and the best mode, modifications and variations may be made to the disclosed embodiments while remaining within the scope of the present invention as defined by the following claims.

What is claimed is:

1. A cellular network for communicating with a plurality of mobile stations on a mobile platform, comprising:

a plurality of base stations positioned at a plurality of locations, each base station having a radio and configured to service respective cells and to communicate with mobile stations in each respective cell;

wherein the base stations are configured to receive radio communications from the mobile stations, to generate messages corresponding to the radio communications and to provide a platform identifier in each message associating the mobile stations with the platform; and a mobile switching center coupled to the base stations and configured to receive the messages and to decode the messages in order to communicate contents of the messages with a public switched telephone network;

wherein the mobile switching center is configured to associate mobile stations having the same platform identifier and to execute a dynamic channel allocation algorithm to determine available radio channels to communicate with the mobile stations having the same platform identifier and when the available radio channels are available to generate an assignment request message and to communicate the assignment request message to a first base station communicating with the mobile stations having the same platform identifier; and wherein the first base station is configured, upon receipt of the assignment request message, to tune its radio to the available radio channels to communicate with the mobile stations having the same platform identifier.

2. The cellular network of claim 1, wherein:

when a quality level of at least one of the mobile stations communicating with a first base station falls below a predetermined threshold, the mobile switching center is configured to handoff all mobile stations having the same platform identifier to a second base station.

3. The cellular network of claim 1, wherein:

when a quality level of at least one of the mobile stations communicating with the first base station falls below a predetermined threshold, the mobile switching center is configured to handoff all mobile stations having the same platform identifier to a second base station, wherein the mobile switching center during a handoff is configured to execute a dynamic channel allocation algorithm to determine available radio channels to communicate with the mobile stations having the same platform identifier and when the available radio channels are available to generate an assignment request message and to communicate the assignment request message to the second base station; and wherein the second base station is configured, upon receipt of the assignment request message, to tune its radio to the available radio channels to communicate with the mobile stations having the same platform identifier.

4. The cellular network of claim 1, wherein:

the message further includes message type, cell identifier and user information.

5. The cellular network of claim 4, wherein:

the platform information includes platform identifier and user information; and the user information includes user identifier, priority, signaling type, encryption information, transcoder mode, classmark information type 2, alert state, service option, and channel information.

6. The cellular network of claim 5, wherein:

the channel information includes channel identifier, channel type, circuit identifier code and sector identifier.

7. The cellular network of claim 4, wherein:

the user information includes user identification, priority, signaling type, encryption information, transcoder mode, service option and channel information.

8. The cellular network of claim 7, wherein:

the channel information includes channel identifier, channel type, layer 3 head information, circuit identifier code and sector identifier.

9. The cellular network of claim 1, wherein:

the platform information includes platform identifier and user information.

10. The cellular network of claim 1, wherein:

the message further includes user handoff information; and the mobile switching center is configured such that when the mobile stations having the same platform identifier are to be handed to a second base station, all mobile stations having the platform identifier are handed off to the second base station.

11. A method of communicating with a plurality of mobile stations on a mobile platform using a plurality of base stations each having a radio and positioned at a plurality of locations and a mobile switching center coupled to the base stations, comprising the steps of:

receiving radio communications from the mobile stations at a first base station;

generating a plurality of messages corresponding to the radio communications and providing a platform identifier identifier in each message associating the mobile stations with the platform;

decoding the messages at the mobile switching center;

communicating contents of the messages with a public switched telephone network;

associating mobile stations having the same platform identifier with one another;

executing a dynamic channel allocation algorithm, in the mobile switching center, to determine available radio channels to communicate with the mobile stations having the same platform identifier;

when the available radio channels are available, generating an assignment request message and communicating the assignment request message to the first base station having a first radio; and upon receipt of the assignment request message, tuning the first radio to the available radio channels to communicate with the mobile stations having the same platform identifier.

12. The method of claim 11, further comprising:

when a quality level of at least one of the mobile stations communicating with the first base station falls below a predetermined threshold, handing off all mobile stations having the same platform identifier to a second base station.

13. The method of claim 11, further comprising:

when a quality level of at least one of the mobile stations communicating with the first base station falls below a predetermined threshold, handing off all mobile stations having the same platform identifier to a second base station having a second radio, including the steps of:

executing a dynamic channel allocation algorithm, in the mobile switching center, to determine available radio channels to communicate with the mobile stations having the same platform identifier;

when the available radio channels are available, generating an assignment request message and communicating the assignment request message to the base station; and upon receipt of the assignment request message, tuning the second radio to the available radio channels to communicate with the mobile stations having the same platform identifier.

* * * * *